United States Patent
Wolf et al.

(10) Patent No.: US 10,713,474 B2
(45) Date of Patent: Jul. 14, 2020

(54) PERSON IDENTIFICATION APPARATUS

(71) Applicant: Bundesdruckerei GmbH, Berlin (DE)

(72) Inventors: Andreas Wolf, Jena (DE); Manfred Paeschke, Wandlitz (DE)

(73) Assignee: Bundesdrunkerei GmbH, Berlin (DE)

( * ) Notice: Subject to any disclaimer, the term of this patent is extended or adjusted under 35 U.S.C. 154(b) by 10 days.

(21) Appl. No.: 15/552,055

(22) PCT Filed: Mar. 9, 2016

(86) PCT No.: PCT/EP2016/055041
§ 371 (c)(1),
(2) Date: Jan. 5, 2018

(87) PCT Pub. No.: WO2016/155998
PCT Pub. Date: Oct. 6, 2016

(65) Prior Publication Data
US 2018/0218200 A1    Aug. 2, 2018

(30) Foreign Application Priority Data

Mar. 27, 2015 (DE) .................. 10 2015 104 768

(51) Int. Cl.
*G06K 9/00* (2006.01)
*G06K 9/20* (2006.01)
*H04N 5/33* (2006.01)

(52) U.S. Cl.
CPC ..... *G06K 9/00288* (2013.01); *G06K 9/00906* (2013.01); *G06K 9/2018* (2013.01); *H04N 5/332* (2013.01); *G06K 2009/00932* (2013.01)

(58) Field of Classification Search
CPC ........... G06K 9/00288; G06K 9/00906; G06K 9/2018
See application file for complete search history.

(56) References Cited

U.S. PATENT DOCUMENTS

| 6,173,068 | B1 | 1/2001 | Prokoski |
| 6,438,255 | B1 * | 8/2002 | Lesniak ............... A61B 5/1127 382/107 |
| 6,920,236 | B2 | 7/2005 | Prokoski |
| 2002/0136435 | A1 * | 9/2002 | Prokoski ............ G06K 9/00221 382/118 |

(Continued)

FOREIGN PATENT DOCUMENTS

| DE | 40 09 051 A1 | 9/1991 |
| DE | 10 2010 016 098 A1 | 9/2011 |

(Continued)

*Primary Examiner* — Mishawn N. Hunter
(74) *Attorney, Agent, or Firm* — Holland & Hart LLP

(57) ABSTRACT

Methods, systems, and devices are described for warless communications. An apparatus may identifying a living person by recording a heat image of a person's facial area and detecting a local heat inhomogeneity in a predetermined detection range of the heat image in order to identify the living person. Identifying the living person may include detecting a heat pattern in a predetermined detection range and comparing the detected heat pattern to a heat reference sample. The predetermined detection range may be detected based on a heat image geometry, using pattern matching, by comparing the heat image to a white light image of a living person, or by masking the heat image.

18 Claims, 3 Drawing Sheets

(56) References Cited

U.S. PATENT DOCUMENTS

| | | | | |
|---|---|---|---|---|
| 2012/0075463 | A1* | 3/2012 | Chen | G01S 11/12 |
| | | | | 348/135 |
| 2013/0235901 | A1* | 9/2013 | Shin | G01J 5/0025 |
| | | | | 374/121 |
| 2014/0184805 | A1* | 7/2014 | Schmidt | H04N 5/33 |
| | | | | 348/164 |
| 2014/0205165 | A1 | 7/2014 | Jeanne | |
| 2014/0266604 | A1 | 9/2014 | Masood et al. | |
| 2014/0285647 | A1* | 9/2014 | Okusu | H04N 5/33 |
| | | | | 348/77 |
| 2015/0148681 | A1* | 5/2015 | Abreu | A61B 5/0008 |
| | | | | 600/474 |
| 2015/0369730 | A1* | 12/2015 | Schmidt | G01S 17/88 |
| | | | | 250/208.1 |
| 2016/0006860 | A1* | 1/2016 | Neitzel | H04M 1/72577 |
| | | | | 455/419 |
| 2017/0116489 | A1* | 4/2017 | Porsch | B60N 2/002 |

FOREIGN PATENT DOCUMENTS

| | | |
|---|---|---|
| DE | 10 2012 203 311 A | 9/2013 |
| DE | 10 2013 015 600 A1 | 3/2015 |
| WO | WO 2005 / 024 732 A1 | 3/2005 |
| WO | WO 2005/027023 A1 | 3/2005 |
| WO | WO 2008/055181 A2 | 5/2008 |
| WO | WO 2015/040001 A2 | 3/2015 |

\* cited by examiner

PERSON IDENTIFICATION APPARATUS

CROSS-REFERENCE TO RELATED APPLICATIONS

This application is a 371 national phase filing of International Application No. PCT/EP2016/055041, entitled "PERSON IDENTIFICATION APPARATUS", filed 9 Mar. 2016, which claims priority to German Patent Application No. 10 2015 104 768.3, entitled "PERSONENERKENNUNGS-VORRICHTUNG", filed 27 Mar. 2015.

BACKGROUND

The following relates generally to the identifying of a living person.

Biometric face recognition techniques can be used to distinguish and/or identify individuals by, for example, analyzing an interocular distance and/or other features of captured images of a person in order to identify the person.

Disadvantageous with known biometric face recognition techniques, however, is that they usually cannot differentiate a living person from a dummy subject having the biometric features of a person or from an image of the person. Such differentiation is however essential when, for example, conducting so-called Presentation Attack Detection (PAD) at electronic access control gates such as e-gates or ABC gates. Dummy and liveness detection is thereby automatically performed in order to differentiate a living person from a dummy subject or from a person's image. To this end, a skin detector can for example be used as is described in printed publication DE 102007017713, its transmission diodes emitting infrared radiation at different transmission wavelengths toward the human skin. The reflected infrared radiation is detected by a reception diode of the skin detector and evaluated as to liveness detection. However, in addition to active illumination, this identification concept requires interaction with the person so that they will, for example, guide their thumb to the skin detector. Such interaction is however not always possible or practical.

SUMMARY

A living person may be identified without interacting with the person.

This task is solved by means of the features of the independent claims. Advantageous further developments constitute the subject matter of the dependent claims, the description and the accompanying figures.

In some cases, a living person may be identified based on recording an image of a person's emitted heat, which is herein referred to as heat recording. By evaluating at least one heat inhomogeneity in the heat recording, such as e.g. a difference in heat or a thermal pattern, a dummy subject can then also be differentiated from a living person when the temperature of the dummy subject corresponds to an average body temperature of a person. Heat inhomogeneity can for example be determined by means of the exhalation or inhalation in the area of the person's mouth or nose or by means of the venation in the facial skin or in the eyes of the person. A heat inhomogeneity depicting a vein image or which is produced by a vein image is moreover unique to each person and can thus also be used to identify a person.

According to a first aspect, a person identification apparatus may be used for identifying a living person comprising a heat image camera which is designed to record a heat image of a facial area of the person and a processor which is deigned to detect a local heat inhomogeneity in a predetermined detection range of the heat image in order to identify the living person. The heat image camera can for example comprise a thermal imaging sensor which detects the radiant heat coming off of or emitted by the person, for example in the infrared wavelength range between 700 nm and 1500 nm. The person is thereby neither illuminated nor irradiated.

The heat inhomogeneity is effected for example by an increased or a decreased temperature in the face of the person. Thus, for example, the temperature in the area of the person's mouth can increase during exhaling as opposed to inhaling. The heat inhomogeneity can also be static and be produced for example by the blood flowing through the veins of the person.

It is thus possible to perform liveness detection on the basis of a passively captured heat image of a person. Interaction with the person is thereby not required. Moreover, the heat inhomogeneity, such as determined for instance by means of a vein image, can be used to identify the person.

According to one example, the processor is designed to detect the predetermined detection range in the heat image particularly on the basis of a heat image geometry or by means of pattern matching or by means of comparing the heat image to a white light image of the person or by means of a masking of the heat image. The predetermined detection range can for example encompass an area of the person's mouth. When a disguise which corresponds to a typical facial geometry is superimposed, the detection range can be determined or respectively detected in the heat image. The detection range can, however, also be determined on the basis of pattern matching in which the heat image is compared to a heat image pattern in which typical arrangements of mouth, nose, eyes or ears of individuals are provided. The detection range can thus be quickly and easily determined.

According to one example, the processor is deigned to detect a distance of the person from the heat image camera by detecting a feature geometry of the person in the white light image, in particular the person's interocular distance. A comparison to a white light image of the person, for example, a digital image taken with a white light camera, enables determining the distance of the person from the heat image camera by for example comparing interocular distances. The heat image or a heat image pattern or a mask can thereby be scaled to enable determining the detection range.

According to one example, the person identification apparatus further comprises an imaging camera for recording a white light image of the person or a communication interface for receiving a white light image of the person, or wherein the heat image camera is designed to additionally record the white light image of the person. The imaging camera can be a white light camera which comprises a sensor so as to take a digital white light image of the person.

According to one example, the imaging camera and the heat image camera are separate units. According to a further example, the heat image camera is designed to also take the white light image of the person. The terms "white light image" means an image of the person in the visible light spectrum. The person identification apparatus can, however, also retrieve the white light image via a communication interface which can, for example, be an internet communication interface or a mobile communication interface or a WLAN communication interface. In this way, the white light image can be recorded by a remote imaging camera.

According to one example, the predetermined detection range is associated with at least one of the following area of the facial image of the person: an area of the nose, an area of the mouth, an area of the eyes, an area of the cheeks, a forehead area or an area of the ears. In the case of time-variable thermal radiation, as is the case for example in the area of the nose or mouth, a time-variable heat inhomogeneity occurs which can be detected by a series of heat images. Although heat inhomogeneity is static in the area of the cheeks or the eyes, it is nonetheless person-specific due to the blood veins running through them.

According to one example, the local heat inhomogeneity is constant over time, wherein the processor is designed to identify the living person based on the detection of the local heat inhomogeneity, or the local heat inhomogeneity is time-variable, wherein the processor is designed to identify the living person based on a change over time in the local heat inhomogeneity. In the case of a temporally constant heat inhomogeneity, which is for example determined by means of venation, only one heat recording is sufficient for liveness detection or for identifying a person. Moreover, a temporal change in the heat inhomogeneity, which is to be expected in the area of the nose and mouth for example due to inhalation and exhalation, can be determined over time in order to conduct a liveness detection.

According to one example, the heat image camera is designed to take a series of heat images of the facial area of the person, wherein the processor is designed to detect a temporal change in the local heat inhomogeneity in the series of heat images in order to identify a living person. The series of heat images can for example be taken within a predetermined interval of time, for example within one, two, three, four, five, ten or twenty seconds, in order to detect a local change in the heat inhomogeneity, for example due to inhalation or exhalation. The average breath of an adult lasts between 4 and 5 seconds so that the predetermined time interval can also be a multiple of this length of time. Doing so enables particularly simple liveness detection.

According to one example, the processor is designed to detect a heat pattern in the predetermined detection range and compare the detected heat pattern to a heat reference sample so as to identify the person when the heat pattern matches the heat reference sample. The heat pattern can be determined for example by means of a local heat distribution, which is person-specific. Such a distribution of heat can be determined for example by means of venation. This not only enables liveness detection but also an identification of the person.

According to one example, the predetermined detection range is an area of the person's cheek, wherein the heat pattern shows a venation in the cheek area, or wherein the predetermined detection range is an area of the eyes and the heat pattern shows a venation, in particular a sclera venation, particularly in a white area of the eye outside of the iris. Generally speaking, the heat pattern can be provided by a person-specific heat distribution determined, for example, by means of vein blood flow or by a specific heat image, for example based on a specific location of veins.

According to one examples, the identification apparatus comprises a communication interface for receiving the heat reference sample and/or a memory for storing heat reference samples of different individuals. The communication interface can be the above-cited communication interface. The heat reference sample can be retrieved for example over a communications network by an identification server, for example an eID server, as is for example the case when verifying biometric features. A secure channel can thereby be established to the identification server to retrieve the heat reference image using cryptographic communication encoding. The database can, however, also be stored locally in the memory or buffered.

According to one example, the heat image camera is designed to detect the heat emissions of the person in order to record the heat image. Detecting only the persons's heat emission dispenses with additionally illuminating the person. The heat recording can in this way be made without interacting with the person.

According to one example, the processor is designed to detect a disguising of a person or a non-living dummy subject in the absence of the local heat inhomogeneity. Doing so provides a simple way of identifying a PAD attack.

According to a second aspect, a method for identifying a living person may include recording a heat image of a facial area of the person and detecting a local heat inhomogeneity in a predetermined detection range of the heat image in order to identify the living person.

The method can be realized as is describe din conjunction with the person identification apparatus. The method can in particular be realized by means of the person identification apparatus.

According to one example, the method comprises the detecting of a heat pattern in the predetermined detection range and comparing the detected heat pattern to a heat reference sample in order to identify the person. The method can thus also be performed to identify a person.

DETAILED DESCRIPTION

Figure 1:
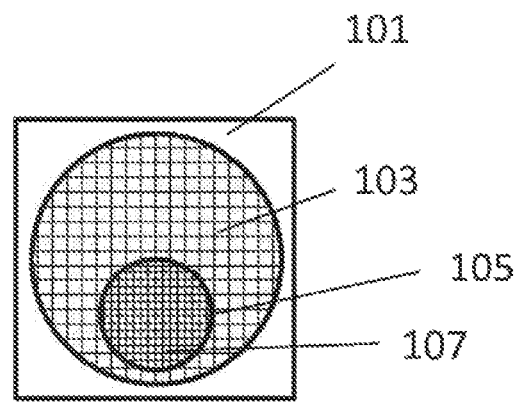
FIG. 1 a heat image according to one example.

FIG. 1 shows a heat image 101 of a facial area 103 of a person schematically depicted by a circle. The heat image 101 further comprises a detection range 105 having a heat inhomogeneity 107. The heat inhomogeneity 107 arises from a temperature difference within the heat image 101. The heat inhomogeneity 107 is moreover localized; i.e. located at a predetermined geometrical position in the facial area 103. In the example depicted as an example in FIG. 1, the heat inhomogeneity 107 is for example located in an area of a person's mouth. The inhomogeneity 107 can, however, be located in an area of the cheeks, an area of the eyes, a nasal region, a forehead area or an area of the ears of the person.

On the basis of the person's image depicted in FIG. 1, any disguising of a person can have already been implemented because a face-covering mask, for example, at least partially disperses possible heat in homogeneities.

The local heat inhomogeneity 107 can be constant over time. This is for example the case when the heat inhomogeneity 107 is produced by blood flow in a person's veins. The local heat inhomogeneity 107 can, however, change over time in terms of temperature, as is depicted in FIGS. 2a and 2b.

Figures 2A, 2B:
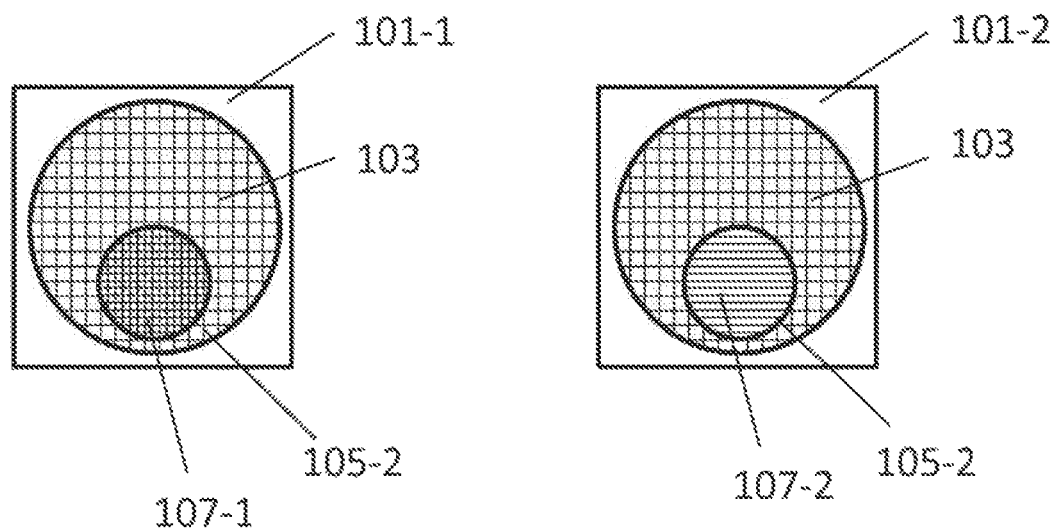
FIGS. 2a and 2b heat images according to one example.

FIGS. 2a and 2b depict heat images 101-1 and 101-2 which were taken at different points in times as a series, e.g., successively. In the heat image 101-1 depicted in FIG. 2a, the heat inhomogeneity 107-1 is characterized for example by a lower temperature than the heat inhomogeneity 107-2 depicted in FIG. 2b. The heat inhomogeneity 107-1 can occur due for example to inhalation and the heat inhomogeneity 107-2 for example due to exhalation in the area of the person's mouth, resulting in different heat inhomogeneity 107 temperature at different times.

Figure 3:
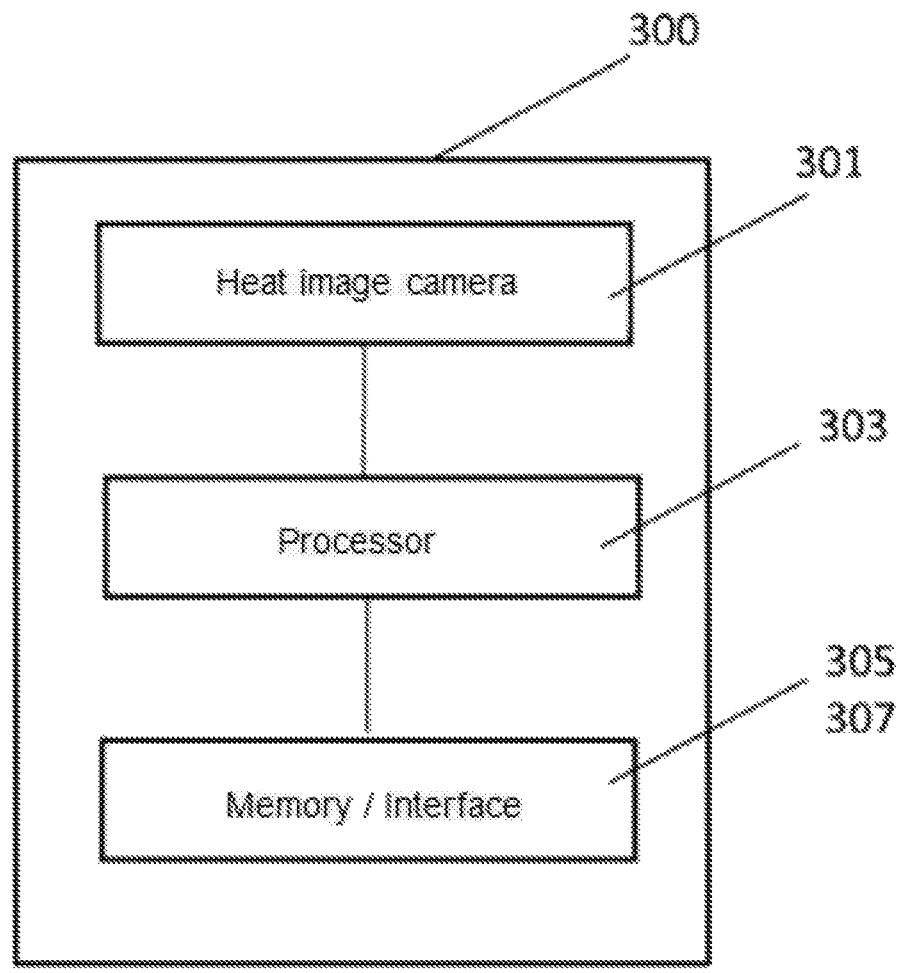
FIG. 3 a block diagram of a person identification apparatus according to one example.

FIG. 3 shows a schematic block diagram of a person identification apparatus 300 for identifying a living person comprising a heat image camera 301 designed to record a heat image of a person's facial area and a processor 303 designed to detect a local heat inhomogeneity, for example heat inhomogeneity 107, in a predetermined detection range, for example in the detection range 105 of the heat image 101, in order to identify the living person.

The person identification apparatus 300 is for example configured to record the heat images 101, 101-1, 101-2 depicted in FIG. 1 as well as in FIGS. 2a and 2b.

The liveness detection can occur for example based on the presence, or detection respectively, of the heat inhomogeneity 107 in a heat image or in a series of heat images as is depicted in FIGS. 2a and 2b.

According to one example, the processor 303 can be designed to identify a person on the basis of the heat image, in particular on the basis of the heat inhomogeneity and a heat pattern defined by the heat inhomogeneity.

Figure 4:
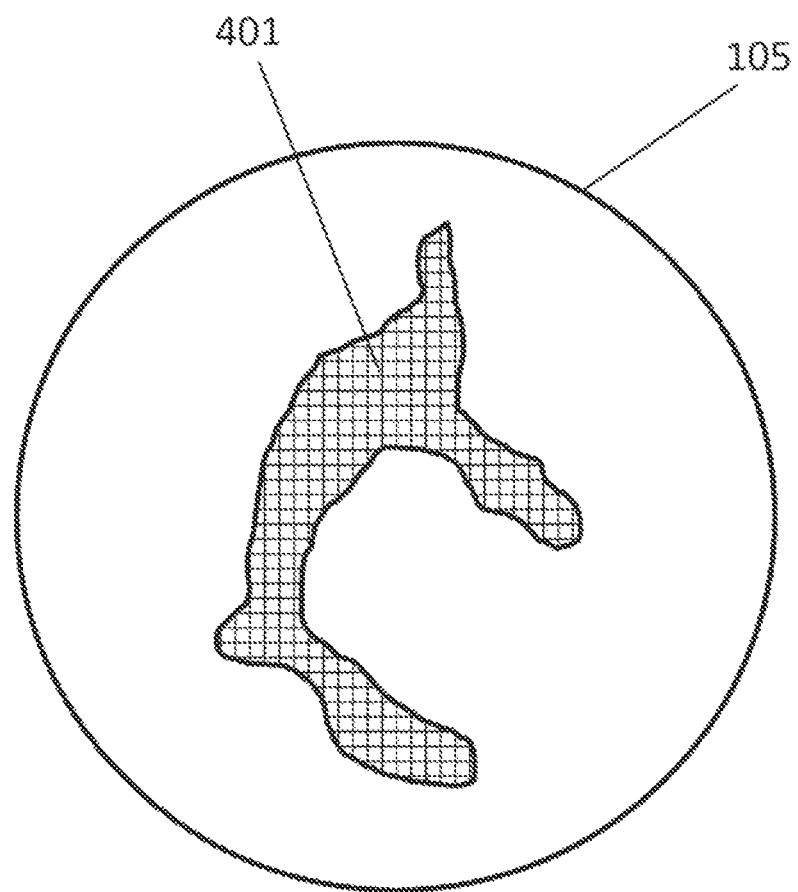
FIG. 4 a heat image pattern.

FIG. 4 depicts an example heat image pattern 401 arranged in the detection range 105. The heat image pattern 401 can be defined for example by means of venation in a cheek area or in an area of the eyes of the person. The heat image pattern 401 is thereby person-specific and can be used to identify the person. In other words, the heat range pattern 401 is a further biometric feature of the person which can be used to identify them. To this end, the processor 303 can be designed to compare the heat image pattern 401 to a heat reference sample of the person in order to identify the person. The heat reference sample can for example be stored in al memory 305 of the person identification apparatus 300. According to one example, the heat reference sample can be retrieved over a communications network via an interface 307 of the person identification apparatus by an identification server. The identification server can for example be an eID server which provides biometric reference samples.

According to one example, the person identification apparatus 300 can comprise a conventional face recognition system having an imaging camera (not shown in FIG. 3) which can be designed to produce a white light image of the person in the visible light spectrum.

According to one example, the heat image camera itself can be designed to take such a white light image. An optional estimation of distance can thereby be performed which can for example be realized on the basis of comparing interocular distances. By so doing, the processor 303 can detect that the person's face is depicted in the heat image in the infrared spectrum. Based on a series of images, for example at a predetermined image repeat rate, e.g. one image per second, a color change can for example be detected at the nostrils; i.e. in the nasal region of the person, which is reflected in the temporal change of the local inhomogeneity 107. In addition, vessels can be detected on the cheeks which can be used not only for liveness detection but also to identify the person.

Furthermore, the processor 303 can be designed to detect a transitioning to the inhomogeneity 107 in order to record the inhomogeneity 107. Such transitions are particularly to be expected around the eyes, nose, mouth as well as forehead of the person.

According to one example, the person identification apparatus 300 can be disposed on an e-gate or in an ABC gate respectively next to a white light image camera for facial recognition. The heat image camera 301 can for example be realized by means of a bolometer sensor.

According to one example, the heat image camera 301 can have a resolution corresponding to or higher than VGA resolution.

According to one example, the heat image camera 301 is positionable based on a white light image of the person so as to record the facial area. The processor 303 can assume the alignment control of the heat image camera 301. The heat image camera 302 can thereby be swivel-mounted on a tripod.

According to one example, an area of a hand can be substituted for the facial area, wherein for example thermal detection of venation in a hand or in a finger is employed in order to identify a person.

One advantage of using the heat image camera 301 is the passivity. No energy is for instance projected into a person's eye, which can increase user acceptance of retina recognition (NIR projected in the eye to illuminate the retina) and iris recognition (NIR illumination of the eye) compared to convention techniques in which a person is actively illuminated.

According to one example, the person can be identified on the basis of the heat recording b means of biometric identification in the same sensor, for example in the person identification apparatus 300. To this end, the processor 303 can additionally perform the biometric identification.

According to one example, the person identification apparatus 300 can be disposed in an access area, for example at an e-gate or an ABC gate. The heat camera 301 can e formed by a bolometer and mounted to a door in front of which individuals seeking entry can suitably position themselves, for example with a cheek facing the heat camera 301. Subject to the result of a comparison of the heat image pattern recorded, the door can open or remain shut as is known per see with biometric access control.

According to one example, the identification of the person based on the heat image pattern can therefore additionally be used for biometric identification.

LIST OF REFERENCE NUMBERS 101 heat image
103 facial area
105 detection rang
107 heat inhomogeneity
300 person identification apparatus
301 heat image camera
303 processor
305 memory
307 interface
401 heat image pattern

What is claimed is:

1. A person identification apparatus for identifying a living person, comprising:
   a heat image camera configured to record a heat image of a facial area of the living person; and
   a processor configured to:
      determine a detection area in the heat image based on comparing the heat image to a heat pattern, comparing the heat image to a white light image of the living person, or masking the heat image, or any combination thereof;
      detect a local heat inhomogeneity in the determined detection area of the heat image in order to identify the living person; and detect a distance of the living person from the heat image camera by, detecting a feature geometry of the living person in the white light image.

2. The person identification apparatus according to claim 1, further comprising:
an imaging camera configured to record a white light image of the living person,
or a communication interface configured to receive the white light image of the living person, or both.

3. The person identification apparatus according to claim 2, wherein the local heat inhomogeneity is time-variable, and wherein the processor is further configured to identify the living person based on a change over time in the local heat inhomogeneity.

4. The person identification apparatus according to claim 1, wherein the determined detection area is associated with at least one of the following areas of a facial image of the person: a nose area, a mouth area, an eye area, a cheek area, a forehead area, or an ear area.

5. The person identification apparatus according to claim 1, wherein the local heat inhomogeneity is constant over time, and wherein the processor is further configured to identify the living person based on the detection of the local heat inhomogeneity.

6. The person identification apparatus according to claim 1, wherein the heat image camera is further configured to take a series of heat images of the facial area of the living person, and wherein the processor is further configured to detect a temporal change in the local heat inhomogeneity in the series of heat images in order to identify the living person.

7. The person identification apparatus according to claim 1, wherein the processor is further configured to:
detect the heat pattern in the determined detection area;
compare the detected heat pattern to a heat reference sample; and
identify the living person when the heat pattern matches the heat reference sample.

8. The person identification apparatus according to claim 7, wherein the determined detection area is a cheek area of the living person and the heat pattern shows a first venation in the cheek area, or wherein the determined detection area is an eye area and the heat pattern shows a second venation.

9. The person identification apparatus according to claim 8, wherein the second venation is a sclera venation.

10. The person identification apparatus according to claim 7, further comprising:
a communication interface configured to receive the heat reference sample, or
a memory configured to store heat reference samples of different individuals, or both.

11. The person identification apparatus according to claim 1, wherein the heat image camera is further configured to detect heat emissions of the living person in order to record the heat image.

12. The person identification apparatus according to claim 1, wherein the processor is further configured to detect a disguising of the living person or a non-living dummy subject in an absence of the local heat inhomogeneity.

13. The person identification apparatus according to claim 1, wherein the heat image camera is further configured to record the white light image of the living person.

14. The person identification apparatus according to claim 1, wherein the detected distance of the living person is an interocular distance of the living person.

15. A method for identifying a living person, comprising:
recording a heat image of a facial area of the living person;
determining a detection area in the heat image based on comparing the heat image to a heat pattern, comparing the heat image to a white light image of the living person, or masking the heat image, or any combination thereof;
detecting a local heat inhomogeneity in the determined detection area of the heat image in order to identify the living person; and
detecting a distance of the living person from the heat image camera by detecting a feature geometry of the living person in the white light image.

16. The method according to claim 15, comprising:
detecting Rail the heat pattern in the determined detection area; and
comparing the detected heat pattern to a heat reference sample in order to identify the living person.

17. A non-transitory computer-readable medium storing computer-executable code for identifying a living person, the code executable by a processor to:
record a heat image of a facial area of the living person;
determine a detection area in the heat image based on comparing the heat image to a heat pattern, comparing the heat image to a white light image of the living person, or masking the heat image, or any combination thereof
detect a local heat inhomogeneity in the determined detection area of the heat image in order to identify the living person; and
detect a distance of the living person from the heat image camera by detecting a feature geometry of the living person in the white light image.

18. The non-transitory computer-readable medium according to claim 17, wherein the code is further executable by the processor to:
detect the heat pattern in the determined detection area; and
compare the detected heat pattern to a heat reference sample in order to identify the living person.

* * * * *

UNITED STATES PATENT AND TRADEMARK OFFICE
CERTIFICATE OF CORRECTION

PATENT NO.         : 10,713,474 B2
APPLICATION NO.    : 15/552055
DATED              : July 14, 2020
INVENTOR(S)        : Andreas Wolf and Manfred Paeschke It is certified that error appears in the above-identified patent and that said Letters Patent is hereby corrected as shown below:

On the Title Page

Item [73], delete "Bundesdrunkerei GmbH" and insert --Bundesdruckerei GmbH--.

Signed and Sealed this
Twenty-ninth Day of December, 2020

Andrei Iancu
*Director of the United States Patent and Trademark Office*